2,843,011

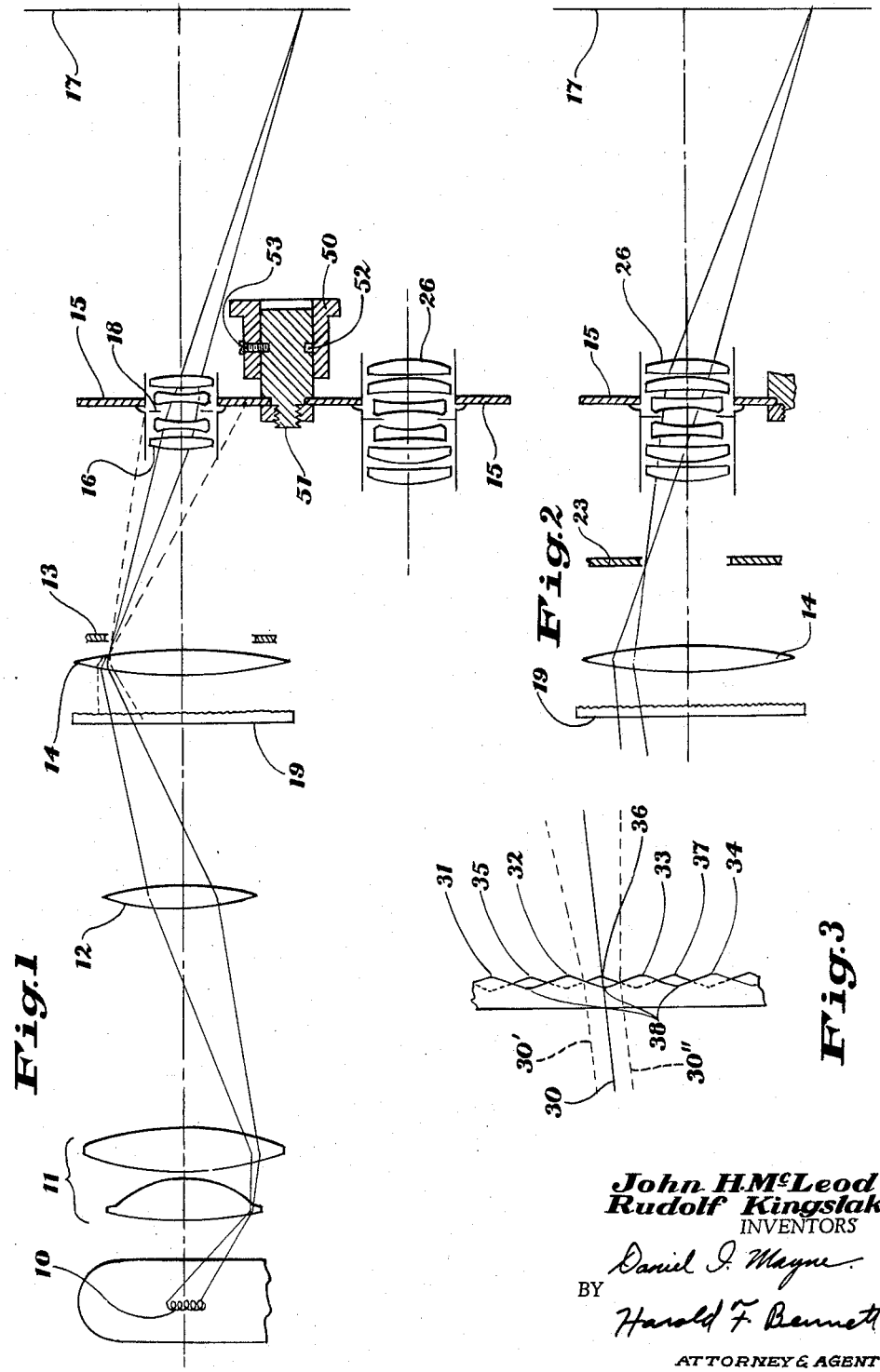

PHOTOGRAPHIC ENLARGERS WITH SCRATCH ELIMINATION

John H. McLeod and Rudolf Kingslake, Rochester, N. Y., assignors to Eastman Kodak Company, Rochester, N. Y., a corporation of New Jersey Application March 4, 1957, Serial No. 643,868

4 Claims. (Cl. 88—24)

This invention relates to photographic enlargers and particularly to enlargers or printers designed to take about a half a dozen standard negative sizes and to project each size at a fixed magnification differing from the magnifications at which the other sizes are projected.

A persistent problem in projection printing of photographs as compared with contact printing is the pronounced undesirable effect of scratches on the surface of the negatives, principally on the emulsion side and to a smaller degree those on the back of the film. In projection printing of negatives, the deeply sloping sides of such scratches refract or diffract the incident light, which is aimed at the entrance pupil of the projection objective and deviate it so that some or all of it misses the lens aperture and is lost. Thus less light from those points in the film where the scratches lie reaches the final enlarged image, and thus the scratches appear as light lines in the final print. In contact printing under diffuse light this effect is not noticeable, and the reasons generally assumed are first that even though the light is deviated by the scratches, the light travels only an infinitesimal distance between the negative and the sensitive paper and so, even though traveling in a wrong direction, it arrives at the paper only an infinitesimal distance from the correct point and second, that, because of the diffuse illumination, when light incident vertically on the negative is deviated away from the vertical, light which is incident obliquely on the negative is at the same time deviated into the vertical and thus the one balances the other.

We have discovered that a great improvement in projection printing is obtained by providing an illumination system which is adapted to project an accurately controlled pattern of light into the plane of the entrance pupil of the projection objective for optimum elimination of the effect of scratches in the original.

Several specific arrangements may be used, differing in detail and adapted for use with different types of film. All of these arrangements, however, involve a bright ring of light surrounding the entrance pupil of the projection objective. The optimum effect is obtained when the brightness of this ring is balanced against that within the pupil so that light is deviated from this bright ring into the lens aperture by the scratches to approximately the same degree as light originally directed toward the lens aperture is deviated away from the lens aperture.

In prior enlargers a light source and a condenser system are provided for projecting a spot of light into the projection objective, the negative holder is arranged between the condenser and the objective, and the platen for holding the sensitive paper is beyond the objective (generally thought of as being in front of the objective). For changing the degree of enlargement and for adapting to different negative sizes, it is usual to move the objective and the platen with respect to the negative holder and condenser. In this prior art, if it is necessary to focus the objective through more than a moderate range, then either the negative is moved with respect to the condenser system or the lamp is moved to refocus the spot of light into the objective.

We have found it very difficult and practically impossible to maintain the required sharpness of focus of the pattern of light in the plane of the entrance pupil of the objective when making all these adjustments for different negative sizes and for different magnifications.

According to the invention, these difficulties are avoided in a projection printer for a fixed number of standard negative sizes and with a constant magnification for each negative size by providing a turret of objectives corresponding in number to the number of different standard sizes of negatives and carefully designed so that the entrance pupil of each objective when in the operative position is in the same plane and has the same diameter as the entrance pupil of any other objective when in the operative position, and the above-mentioned pattern of light is projected thereonto. This arrangement has an additional advantage in that the effective speed of all lenses at the image plane is the same. Preferably, the plane of the projected image is in a fixed position for all negative sizes and the different magnifications are obtained by interchanging lenses of suitable focal length and moving the plane of the negative. The common long conjugate distance is chosen with regard to the largest film format which is to be printed and so as to keep the angular field of this lens within moderate bounds, say 12 or 15° from the axis.

Preferably, the ring of light around the outside of the objective aperture is obtained by interposing an embossed screen of the type described in U. S. Patent 2,589,014, McLeod, between the gate and the source of light. This screen is embossed with a great many small cones, of the order of a million cones per square inch, and has been made up in strip form eight inches wide. The word "cones" is not exactly accurate since the profiles of these dots are not straight lines. Perhaps the word "toric" cones could be used. We have tried providing the outer ring of light by means of a ring mirror similar to that shown in French Patent No. 1,120,984, Ilford, but we find that the screen of toric cones gives a better distribution of light in the ring of light around the objective aperture. It is to be noted that the sloping surfaces of the toric cones do not completely fill the area of the screen but that a little of the screen remains roughly flat for transmitting between 4 percent and 20 percent of the light directly into the aperture of the projection objective.

Another method of scratch elimination known in the prior art consists of providing an opal screen or the like to give general diffusion of the light passing through the negative. This, however, cuts down the brightness of the projected image to an extreme degree and slows down the operation of the printer by making longer exposures necessary. By using "directed diffusion" according to the invention and directing between 70 and 90% of the light into a ring surrounding the objective, we achieve satisfactory scratch elimination and have a several times brighter image than in the completely diffused system.

While the above pattern of light is preferred, the present invention is useful whatever pattern may be found best in any particular case and provides means for utilizing such an illumination system and gaining the full advantages thereof in a projection printer working at different magnifications for different standard film sizes.

In the accompanying drawing:

Fig. 1 is a schematic diagram in axial section of an optical system according to the invention.

Fig. 2 shows a portion of the same system with a different objective in the operative position.

Fig. 3 is an enlarged detail in cross section of a fragment of the cone screen of Fig. 1.

In Fig. 1 light from a light source such as a lamp filament 10 is collected by a condenser 11 and focused onto a relay lens 12. The relay lens 12 images the aperture of the condenser lens 11 near the plane of the film gate 13. A second condenser lens 14 near the film gate relays the filament image into the entrance pupil of the projection lens 16. Finally, the projection lens projects a sharply focused and highly corrected image of the film gate 13 and of any film which may be in the film gate onto the platen 17 on which is supported the sensitized paper.

Alternatively, the known shorter form of condenser may be used in which the lamp filament is placed in the position of the field lens 12 and imaged directly into the pupil of the objective 16. The longer system shown, however, makes it easier to interpose color filters and neutral filters as necessary and to adjust the position of the cone screen as described below.

We have discovered that a very effective method of providing the outer bright ring which surrounds the entrance pupil of the objective is provided by means of a cone-dot or toric cone screen 19 of which an enlarged fragment is shown in more detail in Fig. 3. The section in Fig. 3 is taken through a row of the cone-dots 31 to 34 and shows the next row of cone-dots 35 to 37. These cones have a very obtuse apex angle and are designed to deviate the light that passes through their sides by about 10° as shown by two sample rays 30' and 30". The light, however, which passes through the flat areas 38 between the cones proceeds substantially undeviated as shown by sample ray 30. The effect of putting this cone-dot screen between the light source and the gate as shown in Fig. 1 is to allow a part of the rays passing through the gate 13 to proceed undeviated as shown by the full lines so as to proceed through the projection lens 16, and to deviate others as shown by broken lines to pass outside the pupil of the projection lens by a predetermined amount so as to provide the outer ring of light required for scratch elimination. Moving the cone-dot screen away from condenser lens 14 decreases the diameter of the ring of light and brings part of this light back within the pupil of the objective. This adjustment is very useful for adjusting the apparatus for best scratch elimination.

The turret supporting the different objectives used for different degrees of magnification is shown schematically and fragmentarily in Fig. 1 including a fixed support 50 and axis 51 journaled therein provided with a keyway 52 to cooperate with a setscrew 53 provided in the base 50 for holding it in position. The support plate 15 may have any known construction for supporting a series of lenses in substantially the same plane. Actually, the objectives do not need to be in the same plane at all times, but only the one in the operative position. Thus turrets of known construction may be used in which the lens axes diverge in different directions when in the inoperative positions, but what is essential is that each lens when it is brought into the operative position occupied by lens 16 in Fig. 1 is so positioned that its entrance pupil is in the same plane as the entrance pupil of any other of the objectives when in the operative position.

Fig. 2 shows a shorter focal length objective 26 suitable for printing smaller negatives at higher magnifications having been brought into the operative position. Associated with the lens 26 is the film gate 23 positioned closer to the lens 26 and farther from the second condenser 14 than the corresponding position of film gate 13 shown in Fig. 1.

It may be noted that the shorter focal length requires the second condenser lens 14 to be of larger diameter to fully illuminate the area of the negative gate but that the larger diameter is of no disadvantage when used with the longer focal length lens 16, hence the larger diameter is used for all the lenses in the turret.

In other respects the rest of the system is the same as in Fig. 1 and is omitted from Fig. 2.

Normally, there are five to eight objectives of different focal length in the turret, of which only two are shown in the drawings.

In a specific embodiment of the invention which is adapted to print several currently standard size originals onto a 3 by 5½ inch or a 3 by 4½ inch format in a plane approximately 320 mm. from the objective, the lens aperture being in all cases 22.8 mm., the following specifications have been found suitable:

| Film | $m$ | $f$, mm. | Relative Aperture | Short Conjugate, mm. | Field Angle, degrees |
|---|---|---|---|---|---|
| 616 | 1.31 | 139.4 | $f/6.1$ | 247.0 | 13.5 |
| 620 | 1.46 | 130.5 | $f/5.7$ | 220.4 | 12.1 |
| 127 | 2.13 | 102.8 | $f/4.5$ | 151.5 | 12.1 |
| 828 | 3.15 | 79.6 | $f/3.5$ | 106.0 | 12.1 |
| 135 | 3.58 | 71.9 | $f/3.2$ | 92.7 | 12.1 |
| Stereo | 3.89 | 65.4 | $f/2.9$ | 82.3 | 12.1 |

In this table, the film sizes are listed by their current commercial designation in the first column. The last column gives the semi-angular field measured to the corner of the image area. The other columns are self-explanatory or as already defined.

We have found lenses of the type described in U. S. 2,338,614 Aklin to be suitable for use in copying the four larger sized negatives and objectives of the type shown in Ser. No. 643,839 Altman, filed March 4, 1957, to be suitable for use in copying the two smaller sizes. The first of these comprises two biconvex lens elements and two negative lens elements spaced therebetween and the second is similar except that each biconvex element is replaced by two positive elements.

The magnification $m$ at which each standard transparency size is to be printed to give the required size print is predetermined. When a lens type capable of covering the required field of view has been selected and the lens designed so that it is sufficiently free of residual aberrations, the distance between the entrance pupil (facing the transparency) and the front principal point (facing the image) is computed. The ratio of this distance to the equivalent focal length of the objective is designated as $e$, and the focal length $f$ in which the objective is to be made up is determined by the formula $$f = \frac{L}{1+m+e}$$

where L is the predetermined distance from the entrance pupil to the image plane. Optionally, the entrance pupil is assumed to be at the front nodal point and the simpler formula $$f = \frac{L'}{m+1}$$

usually gives a close enough approximation. The object distance L is determined by the standard formula $$L = \left(\frac{1}{m}+1\right)f$$

We claim:
1. A photographic enlarger or projection printer comprising an illuminating system for illuminating a transparency, a plurality of interchangeable projection objectives having predetermined focal lengths and having an operative position, each objective being adapted when in the operative position to receive light from a transparency of a predetermined size and to project a sharply focused image having a predetermined degree of magnification, turret means facilitating the removal of one objective from and the moving of another objective into the operative position, means defining an image plane in front of the objective in said operative position, and means for supporting a transparency of the size associated with each objective respectively in a plane conjugate to said image plane with respect to said respective objective when said respective objective is in said operative position, characterized by the respective focal lengths $f$ being predetermined according to the formula $$f=\frac{L}{1+m+e}$$

where L is the distance from the entrance pupil of the objective to said image plane and is the same for all said objectives, where $m$ is the predetermined magnification at which the respective objective operates and is considered as positive, and where $e$ is the ratio of the distance between the entrance pupil and the front principal point to the focal length of the respective objective and is considered as positive when the principal point is in front of the entrance pupil and as negative when it is therebehind, whereby the location of the entrance pupil remains unchanged when said objectives are interchanged, further characterized by the size of all said respective pupils being the same, and still further characterized by the illuminating system being adapted to project a predetermined pattern of light onto the plane of the entrance pupil, said pattern including a predetermined amount of light inside the entrance pupil of the objective and a ring of predetermined diameter and average brightness surrounding the entrance pupil whereby scratches on the transparency have a minimum effect in the image.

2. An enlarger according to claim 1 further characterized by having in the illuminating system in a position such that it is traversed by the illuminating beam of light a sheet of transparent material having thousands of tiny dots of generally conical contour embossed on its surface for producing said ring of light surrounding the entrance pupil of the objective.

3. An enlarger as claimed in claim 2 in which the area remaining between said conical dots is sufficient to permit 4% to 20% of the light to proceed to the entrance pupil of the objective and in which the apex angle of said conical dots is such as to deviate the rays an average of approximately 10°.

4. In a projection printer adapted to selectively project images of photographic transparencies of a plurality of standard sizes onto sensitized paper at a different predetermined fixed magnification for each standard size transparency, in combination, a light source, an optical condenser system, film gate means adapted to selectively support the several sizes of transparencies in predetermined respective object planes for illumination by said lamp and condenser system, a corresponding plurality of projection objectives, turret means for selectively positioning each objective in a predetermined operative position for projecting an image of a transparency of the corresponding size onto a predetermined image plane, and means for supporting the sensitized paper in said image plane, characterized by said lamp, said condenser and said image plane having the same relatively fixed positions for all standard sizes of transparencies, by the position and size of the entrance pupil being the same for each of said objectives when in the operative position, by the focal length $f$ of each objective being predetermined according to the formula $$f=\frac{L'}{m+1}$$

where L' is the distance from the front nodal point of the objective when in the operative position to the image plane and $m$ is the respective predetermined magnification, the front of the objective being defined as the side facing the image plane, by the position of respective object planes being predetermined according to the formula $$L=\left(\frac{1}{m}+1\right)f$$

where L is the distance from the rear nodal point of the objective when in the operative position to said respective object plane, and by said light source and condenser system jointly being adapted to project a predetermined pattern of bright and relatively dark areas onto the plane of said entrance pupil for optimum elimination of shadows in the image due to scratches on the original, at least one bright area being within said entrance pupil and at least one other bright area substantially surrounding said pupil.

No references cited.